Nov. 19, 1968    J. D. FOX ET AL    3,411,447
REPULSION INDUCTION PUMP
Filed April 7, 1967    3 Sheets-Sheet 1

INVENTORS
JOHN D. FOX
THOMAS W. F. FOSTER
BY
Paul E. Calrow
ATTORNEY

Nov. 19, 1968  J. D. FOX ET AL  3,411,447
REPULSION INDUCTION PUMP
Filed April 7, 1967  3 Sheets-Sheet 2

RELATIONSHIP BETWEEN POLE FLUX
AND DISTANCE FROM COIL
ALSO FORCE VS DISTANCE

COIL VOLTAGE: 120
COIL AMPS: 1.75
UNLOADED

INVENTORS
JOHN D. FOX
BY THOMAS W.F. FOSTER

Paul E. Calrow
ATTORNEY

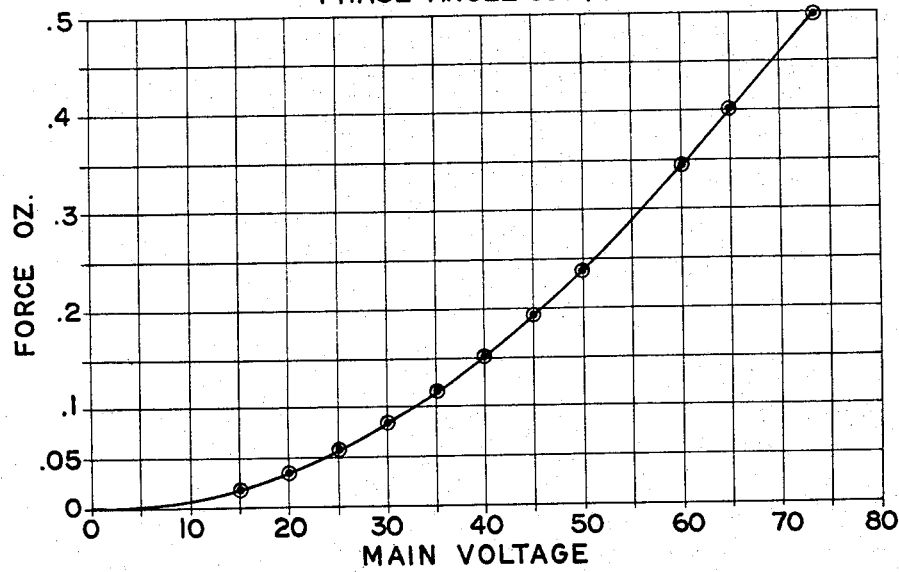
Fig-5
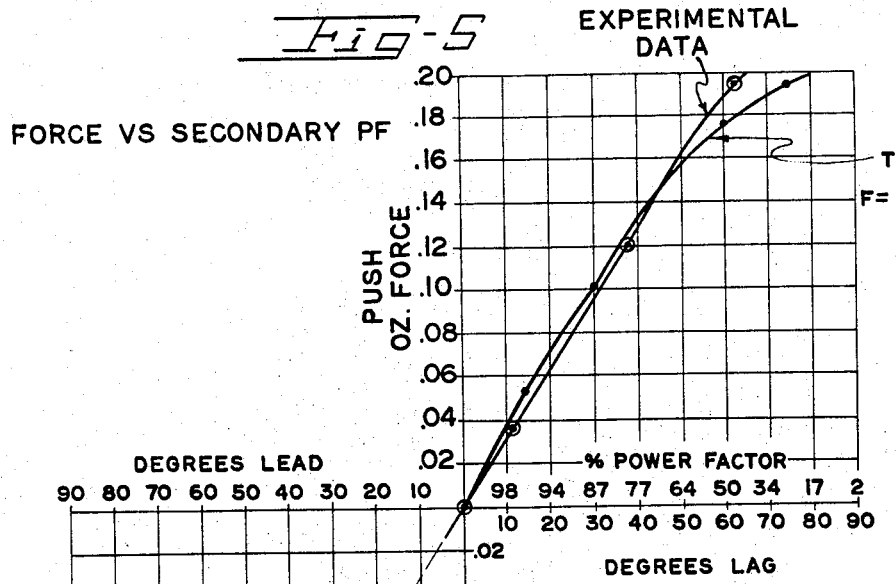
Fig-6
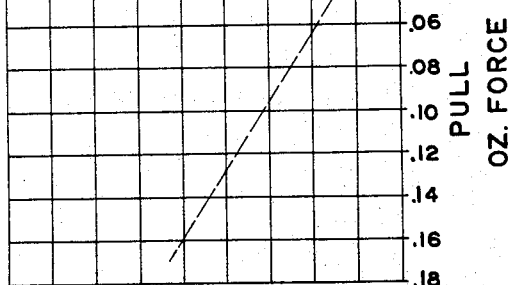

United States Patent Office 3,411,447
Patented Nov. 19, 1968

3,411,447
REPULSION INDUCTION PUMP
John D. Fox, Lafayette, and Thomas W. F. Foster, Walnut Creek, Calif., assignors to Kaiser Aluminum & Chemical Corporation, Oakland, Calif., a corporation of Delaware
Filed Apr. 7, 1967, Ser. No. 629,136
5 Claims. (Cl. 103—1)

ABSTRACT OF THE DISCLOSURE

This disclosure relates to an electromagnetic pump for electrically conductive fluids. The pump operates on the repulsion induction principle to pump the fluid. The pump is designed with a high ratio of reactance to resistance in the secondary circuit. Because of this, the pump receives its thrust from the large lagging component of the secondary current which is in phase opposition to the primary flux which passes through it. Thus, the operation of the pump is due to two directly opposed fields, one created by the primary current and one created by the secondary current. The force of the pump is proportional to the product of the two fields and increases at an exponential rate as the secondary is moved toward the primary.

Background of the invention

This invention relates to electromagnetic pumps. The development and interest in electromagnetic pumps has largely been due to the necessity of circulating liquid metal heat transfer media in nuclear reactor systems. As these pumps have been developed, however, it has become more apparent that their usefulness is not limited to the nuclear reactor field. All prior art electromagnetic pumps utilize the motor principle—that a conductor in a magnetic field, carrying a current which flows at right angles to the direction of the field has a force exerted on it, the force being mutually perpendicular to both the field and the current. In all electromagnetic pumps, the fluid is the conductor. This force, suitably directed in the fluid, manifests itself as a pressure if the fluid is suitably contained. The field in turn can be produced in a number of different ways and the force utilized variously.

As has been stated, the electromagnetic pumps can be compared to electric motors in their basic operating principle. This fact permits a classification of the prior art pumps. The two main groups are the conduction pumps, closely related to DC motors (homopolar types), and the induction pumps, which find their counterparts in induction motors and synchronous machines.

All conduction pumps are characterized by electrodes which conduct the current from an external source through the liquid to be pumped. They are further classified as DC and AC pumps.

When direct current is employed, both permanent magnets or electromagnets can be used to establish the flux in the "air gaps." With alternating current, it is necessary to connect the field winding in series with the "armature" (the conducting liquid) to insure that no phase difference exists between field and armature current. As a result, a pulsating but unidirectional pumping force acts on the liquid, as the pulsating torque of a universal motor does when it is operated on alternating current. With the exception of two pumps, all types of conduction pumps can, in principle, be operated as universal pumps, that is, either with alternating or direct current. The first exception is the homopolar pump and the second is the linear pump with combined transformer.

Induction pumps always have alternating current induced in the liquid. They can be classified by the way this current is established. In the first group of induction pumps, alternating current is induced in the field by an alternating flux stemming from a stationary single-phase or polyphase winding. Single-phase induction pumps resemble transformers with movable secondary winding, whereas polyphase pumps have either a traveling or rotating magnetic field. The latter type can be compared to an induction motor in its operating principle. In the second group of induction pumps, alternating current is induced in the liquid by means of a mechanically rotated field structure with permanent magnets or electromagnets. Clearly, these pumps are related to synchronous machines in their basic operating principle.

Summary of the invention

It is an advantage of the instant invention that it provides a pump which has no moving parts. It is a further advantage that the pump, according to the instant invention, has a magnetic circuit which has been designed open so as to simplify the electrically conductive fluid passage and remove the electric coils from any shorting problems and problems of heating by a hot and/or corrosive electrically conductive fluid. It is an additional advantage of the instant invention that the pump does not require electrodes of good electrical conductivity or any other sort in contact with the electrically conductive fluid to be pumped. It is a further advantage of the instant invention that the pump requires only a single coil. Most induction principle pumps require two electrical coils and may require out of phase voltages for these coils which adds to the complexity of the design.

The pump, according to the instant invention, obtains thrust from the basic force that exists between two opposing magnetic fields. The primary field is created by a simple helix connected to an alternating current (AC) power source. The secondary field is induced in the conductive fluid by the primary field. With an AC power source, the fields may oppose or attract each other at any give instant depending on the phase angle between the two fields. In order to obtain large opposition between the fields, the electrical circuit of the secondary must be designed with a high ratio of reactance to resistance.

Technically, the opposition develops in this manner:

(a) The portion of the primary field linking the secondary (conductive fluid) induces a secondary voltage which leads the primary field by 90 electrical degrees.

(b) This secondary voltage causes a secondary current to flow in the conductive fluid. The magnitude and phase angle of this current is determined by the resistance and reactance of the secondary circuit.

(c) The reactive component of secondary current leads the secondary voltage by another 90 electrical degrees making the field it creates 180 degrees out of phase with the primary field, thus giving continuous opposition between these fields.

(d) The resistance component is in phase with the secondary voltage, thus 90 degrees out of phase with the primary field. At 90 degrees, opposition is equal to attraction so no net force results. However, this component of the current produces heating of the conductive fluid and can be very desirable in some processes.

Power is developed by the pump as soon as the force between the opposing magnetic fields causes movement of the conductive fluid. An incremental ring of conductive fluid will continue to develop pumping power as long as it has a lagging current component and continues to move away from the primary field. This power decreases very rapidly with distance.

Pumping energy comes from both the primary and secondary magnetic fields as the fields move apart and the reluctance of their magnetic paths diminish. Since the maximum energy demand on these fields occurs when the supply voltage is zero, a large amount of energy must be stored in the fields to fill this need.

Primary flux is forced to remain fairly constant in order to satisfy the back electromotive force (EMF) of the power supply. Primary current will then vary as needed to force the flux through the varying reluctance of the primary flux path. As a primary voltage cycle starts with fresh conductive fluid close to the coil, large primary current is necessary to force the required flux through the restricted flux path. As the conductive fluid with intimate secondary field recedes, less and less current is necessary to maintain the primary flux through the decreasing reluctance. By the time the voltage is again zero, and the field starts collapsing, the energy in the field and the current to be returned to the power source, will be less than absorbed. In this way, energy is taken from the power source, transported through the field and delivered as moving conductive fluid in the pump.

Accordingly, this invention relates to an electromagnetic pump for electrically conductive fluids. The pump comprises an electrical coil with an alternating current power source connected to the coil. An annular conduit is positioned in axial alignment with the coil for conducting the electrically conductive fluid. The outside diameter of the conduit has a ratio to the inside diameter of the conduit of not less than about 1.01. Desirably the ratio is not more than about two. If there is a greater ratio, turbulence will build up in the electrically conductive fluid due to internal circulation and the output pressure of the pump will fall off. A portion of the end of the conduit adjacent the coil flares outwardly so as to form an entry channel for the fluid. Due to this critical arrangement of the various parts of the pump, when an alternating current is applied to the coil, it induces a magnetic field in the core of the coil which induces a voltage in the electrically conductive fluid in the conduit creating a magnetic field in opposition to the magnetic field created by the current applied to the coil so as to create a force on the current conducting fluid causing the fluid to flow through the conduit in a direction away from the coil.

The internal diameter of the conduit desirably is not less than about one-half the internal diameter of the coil and the external diameter of the conduit is not greater than about twice the external diameter of the coil. The apparatus also desirably includes a magnetic core positioned within the hollow electrical coil to perform the function that such a magnetic core usually performs in such a position. Preferably, a portion of the magnetic core extends axially within the inside wall of the annular conduits again for the conventional reason. To improve the efficiency so far as power consumption of the apparatus is concerned, a flux return path having a permeability not less than about two (air with a permeability of one is the reference standard) is extended from the magnetic core along and externally of the coil and conduit.

*Brief description of the drawing*

Other objects and advantages of this invention will be apparent from the above description taken in conjunction with the accompanying drawings. The accompanying drawings are illustrative of an advantageous embodiment of this invention. In the drawings:

FIGURE 5 is a graph showing the relationship between coil voltage and force of a pump made in accordance with the principles of the instant invention.

FIGURE 6 is a graph showing the relationship between force and secondary power factor of a pump made in accordance with the principles of the instant invention.

Figures 1, 2:
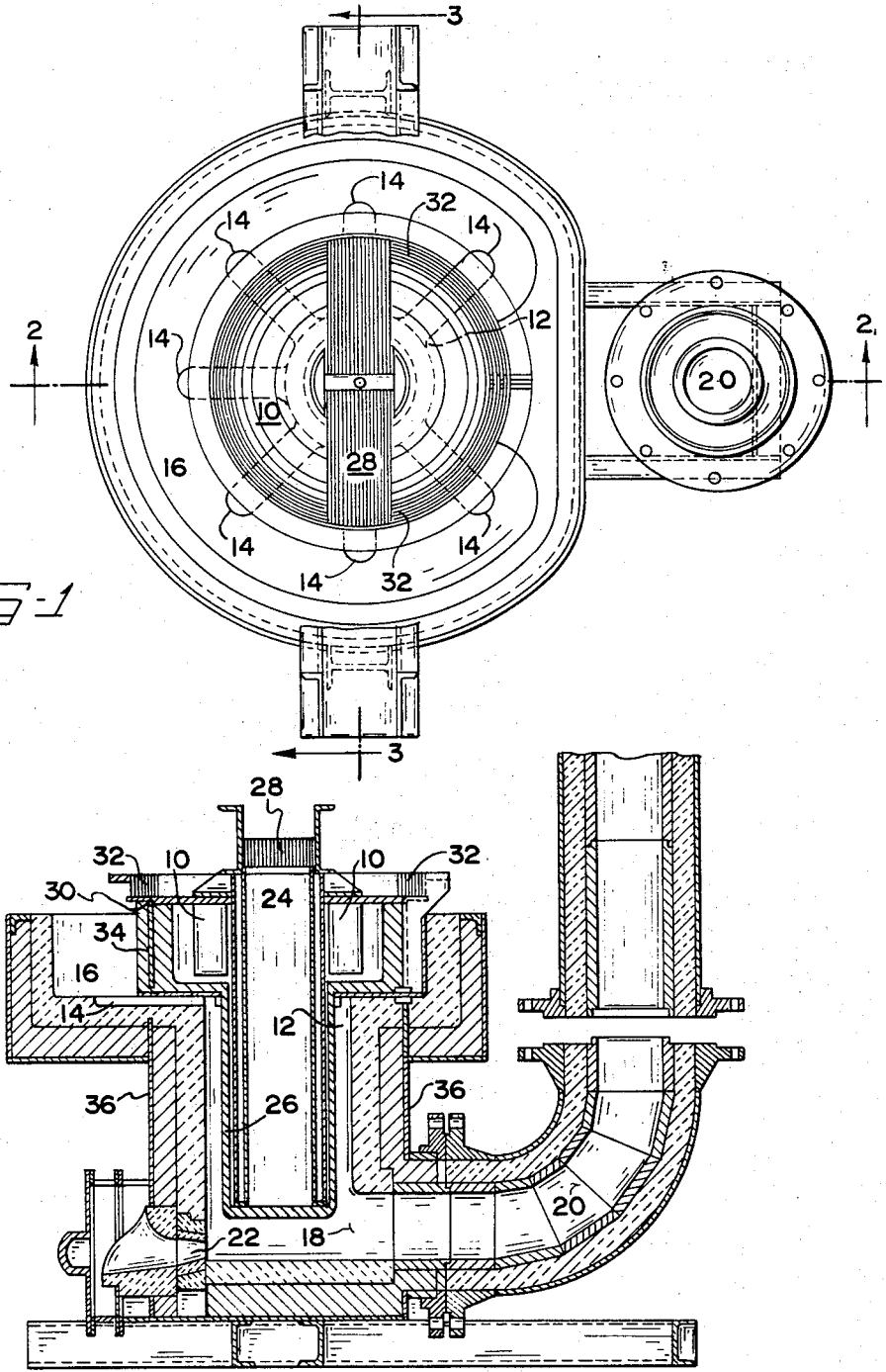
FIGURE 1 is a top plan view, partly in section and with parts removed for purposes of clarity of an electromagnetic pump embodying the principles of this invention.
FIGURE 2 is a side-elevational view in section and with parts removed for purposes of clarity, taken along line 2—2 of FIGURE 1.
Figure 3:
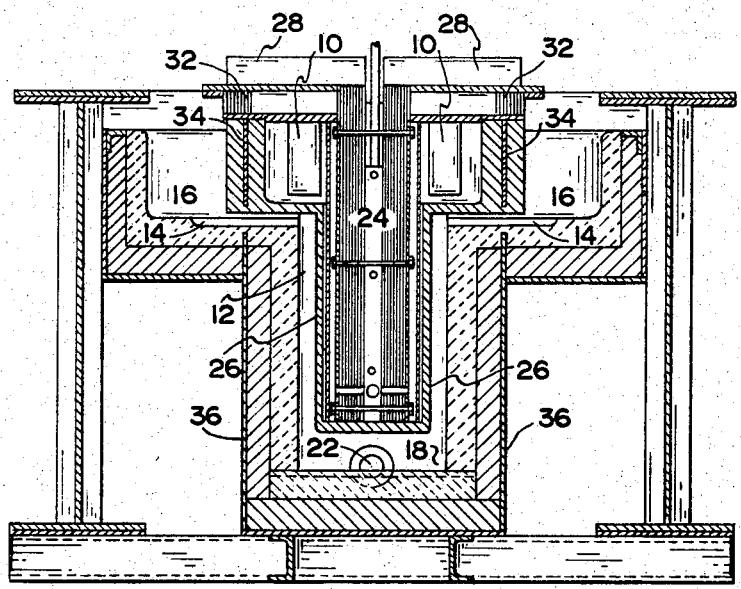
FIGURE 3 is a side-elevational view, partly in section and with parts removed for purposes of clarity taken along the line 3—3 of FIGURE 1.

Referring now to the drawings in which the same reference numerals have been applied to the corresponding parts and with particular reference to FIGURE 1, an electrical coil 10 is shown. A suitable alternating current power source not shown is connected to the coil. An annular conduit 12 is positioned in axial alignment with the coil. At least a portion of the end of the conduit 12 adjacent to coil 10 flares outwardly so as to form an entry channel 14 for the fluid. As shown in the drawings, in this embodiment more than one entry channel 14 is provided. It will be observed that entry channel 14 cannot be a continuous 360° circle around conduit 12. This is so as to break up the conductivity path through the electrically conductive fluid being pumped so that it will not pump back out the entrance as it would if current flowed through the entering metal. Such current flow would be possible with a 360° entry channel 14. As shown in the drawings, electrically conductive fluid would flow into entry channels 14 from reservoir 16. As shown in the drawing, reservoir 16 also does not form a complete circle around the coil 10. This is not a critical limitation, but if a continuous 360° reservoir 16 was provided, then flux around the reservoir 16 from coil 10 could induce current flows in reservoir 16 which at least would be wasted energy so far as the instant application of the electromagnetic forces is concerned. This is not a critical limitation however and if for some reason one desired current flows in reservoir 16, it could be provided in this manner.

Conduit 12 terminates in discharge port 18 which leads the electrically conductive fluid being pumped into discharge line 20. As shown in the drawings, discharge port 18 is provided with a suitable clean-out hole 22. A suitable closure, such as a bung (not shown), is provided for clean-out hole 22.

A suitable core 24 of magnetic material, such as a lamination of ferromagnetic alloy strips, is positioned within the hollow electrical coil 10. As shown in these figures, a portion of core 24 desirably extends axially within the inside wall 26 of conduit 12. In the embodiment shown the opposite end of core 24 from that extending within inside wall 26 of conduit 12 extends upwardly and into contact with legs 28 which extend outwardly of coil 10. Extending from legs 28 of core 24 along and externally of coil 10 and conduit 12 is a flux return path indicated generally at 30. In the embodiment shown in the drawings, flux return 30 comprises beam assembly 32 in electrically conductive contact with legs 28, and has a circular extension piece 34 extending around and outside of coil 10. Extending along and externally of coil 10 and conduit 12 from circular extension 34 is shroud 36 of a material having suitable permeability. Flux return 30 is not absolutely essential as air itself has sufficient permeabiilty (one, since air is the reference standard) to provide a path for the flux to return to the core 24. The use of a flux return 30 as described herein which is made of material, such as a ferromagnetic alloy of ferrite selected so as to have a permeability not less than about two with reference to air as one, improves the efficiency of the device and reduces the line current required for a given pump output. For the same reasons discussed previously, it will be observed that the flux return assembly 30 does not describe a complete circle around the core 24 and coil 10 but is broken so as to provide an electrically broken-up path.

Detailed description

Referring again to the drawings, in the operation of a pump embodying the principles of this invention an alternating voltage is applied to coil 10 which produces a current flow to the coil 10. This current induces a magnetic field in the core 24 which endeavors to follow the lowest reluctance path, principally through the electrically conductive fluid conduit 12. This field induces a voltage in the electrically conductive fluid which lags the phase angle of the magnetic field in core 24 by 90°. When the electrical properties of the electrically conductive fluid conduit 12 are designed for a low value of resistance with respect to inductive reactance, i.e., the ratio of the outside diameter to the inside diameter of conduit 12 must be not less than about 1.01, the electrical current flowing in conduit 12 will lag the induced voltage by an additional 90°. The magnetic field created by the current flow in the fluid in conduit 12 will now directly oppose the field created by the current flow in coil 10 and the force between these fields will be proportional to their products. Since the force on the field in core 24 is reflected on the source of the field, a downward force will exist on the electrically conductive fluid conduit 12 to cause the electrically conductive fluid to flow through the pump. The in-phase component of the current in the electrically conductive fluid in conduit 12 will create only heat in the electrically conductive fluid which could also be useful in certain applications. Since most of the force is developed at the entrance end of conduit 12, the entry channel 14 must be electrically broken up as discussed previously to prevent electrical flow and consequent forces preventing entry of electrically conductive fluid into the pump or possible back pumping of the pump. The factor which limits the upper value of the ratio of the outside diameter of conduit 12 is that if the ratio is too great then there will be a loss of pump output due to violent physical eddy currents inside the conduit 12. Practically, this limits the ratio to not more than about two.

The operation of the pump can be thought of as two in-phase and directly opposed fields, one created by the primary current and one created by the secondary current. The force of the pump is then proportional to the product of the two fields and increases at an exponential rate as the secondary is moved toward the primary. Since both fields are 90° out of phase with the line voltage, the moment of maximum force on the electrically conductive fluid occurs when the line voltage is zero and no energy is available from this source. The energy comes from the magnetic fields which are maximum at this time and which move apart as the electrically conductive fluid flows. Eenergy is absorbed with a basic force times distance action. The energy comes not from a change in the quantity of flux lines but from reduced reluctance of the magnetic paths which occurs when more air space is added for flux occupancy as the secondary moves away. The rate of change of flux linkages remains as before in order to satisfy the back electromotive force (EMF) requirements of the primary. With this type of operation, it is evident that a proper balance must be obtained between exciting energy and the pumping energy required. This means the exciting current must be quite high. As flow of the electrically conductive fluid occurs, the energy going into the fluid will not be returned to the line. This will show up as a reduction in the lagging portion of the current being returned to the line, a reduction in total current and a rise in power factor.

Figure 4:
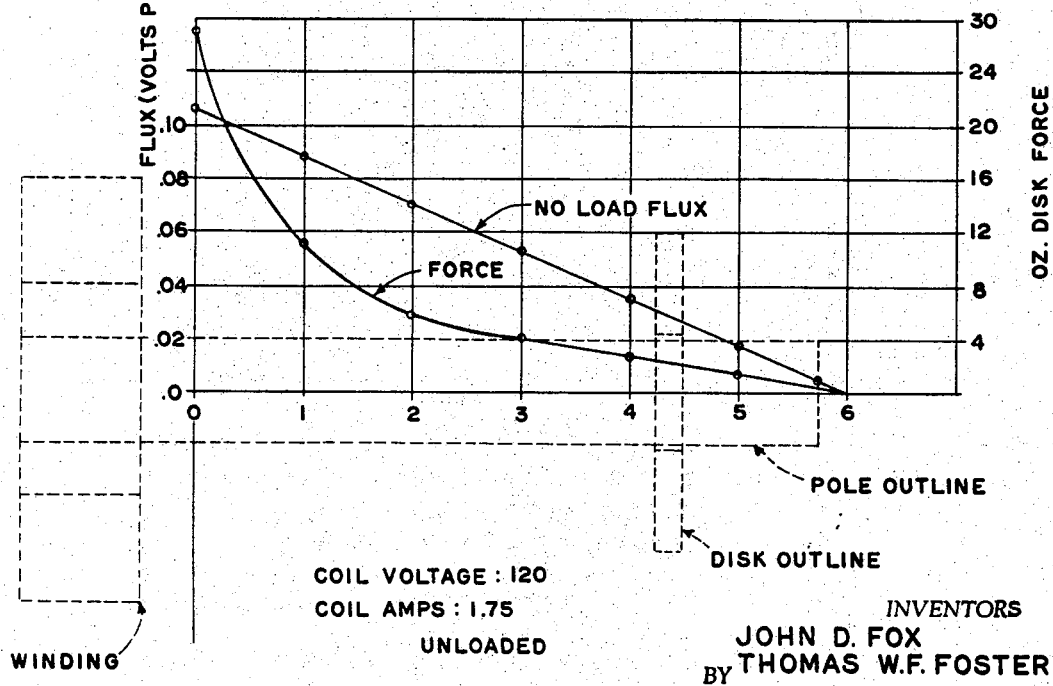
FIGURE 4 is a graph showing the relationship between pole-flux and distance from coil and also force and distance of a pump made in accordance with the principles of the instant invention.

A series of experiments were run using a pump substantially the same as that described hereinabove. Some of the results of those experiments are represented in FIGURES 4, 5 and 6, inclusive. Referring now to those figures and first specifically to FIGURE 4, the test showed that the static pressure of the pump increases very rapidly as the pumping surface approaches the coil 10. This means that in scaling up or designing a pump for a particular application, insulation thickness and the size of entry channels 14 should be kept at a minimum consistent with the other requirements of the pump, such as the capacity. The force on an incremental ring of electrically conductive fluid encircling core 24 of the pump varies inversely with the diameter of the ring. Therefore, the width of the conduit 12, i.e., the pumping channel, should be kept small or internal circulation might become serious. It was found that the ratio of the external diameter of conduit 12 to the internal diameter of conduit 12 should be not more than about two and the internal diameter of the conduit should be not less than about one-half the internal diameter of the coil and the external diameter of the conduit not greater than about twice the external diameter of the coil for best results. Within these limits, it is possible to design a conduit 12 which satisfies this criterion. As shown in FIGURE 4, a magnetic force applied to increments of electrically conductive fluid by the magnetic field will be greatest closest to the coil 10 and will decrease as the distance from the coil 10 increases. FIGURE 5 shows that for voltages below magnetic saturation of core 24, the static pressure of the pump is proportional to the square of the voltage.

The static pressure of the pump is proportional to the lagging component of the current in the electrically conductive fluid as shown in FIGURE 6. The lag angle is kept large by increasing the core 24 size, increasing the thickness of conduit 12 and increasing the depth of conduit 12 within limits or by increasing the conductivity of the fluid. The force on the fluid is a net force equal to the difference in force exerted at the two ends of the pump. If the magnetic circuit is completed from one end of coil 10 to the other and a ring of fluid placed in the circuit center, no net force results even though the current in the ring of electrically conductive fluid is lagging the voltage. As the incremental ring of electrically conductive fluid is pushed nearer and nearer the coil face (see FIGURE 4), two things would happen to increase the pressure between the two: as the ring moves along core 24, the flux increases including a stronger field in the incremental ring of fluid and a greater force since the force is equal to the product of the fields. In addition, the primary flux is prevented from seriously diminishing as it is squeezed into the smaller space between the coil 10 and the incremental ring of electrically conductive fluid since any loss of flux decreases the back electromotive force of the coil 10 and the line current rises accordingly until equilibrium is reestablished.

While there has been shown and described hereinabove the presently preferred embodiment of this invention, it is to be understood that the invention is not limited thereto and that various changes, alterations, and modifications can be made thereto without departing from the spirit and scope thereof as defined in the appended claims wherein

What is claimed is:

1. An electromagnetic pump for electrically conductive fluids comprising:
   (a) an electrical coil;
   (b) an alternating current power source connected to the coil;
   (c) an annular conduit in axial alignment with the coil for conducting an electrically conductive fluid, the outside diameter of the conduit having a ratio to the inside diameter of the conduit of not less than about 1.01, a portion of the end of the conduit adjacent the coil flaring outwardly so as to form an entry channel for the fluid whereby when an alternating current is applied to the coil, it induces a magnetic field in the core of the coil which induces a voltage in the electrically conductive fluid in the conduit creating a magnetic field in opposition to the magnetic field created by the current applied to the coil so as to create a force on the current conducting fluid causing the fluid to flow through the conduit in a direction away from the coil.

2. The apparatus of claim 1 wherein the internal diameter of the conduit is not less than about ½ the internal diameter of the coil.

3. The apparatus of claim 1 wherein the external diameter of the conduit is not greater than about twice the external diameter of the coil.

4. The apparatus of claim 1 wherein a magnetic core is positioned within the hollow electrical coil.

5. The apparatus of claim 4 wherein a portion of the magnetic core extends axially within the inside wall of the annular conduit.

References Cited

UNITED STATES PATENTS

| 2,536,859 | 1/1951 | Tama | 103—1 |
| 2,539,800 | 1/1951 | Tama | 103—1 |
| 2,807,212 | 9/1957 | Lindenblad | 103—1 |

OTHER REFERENCES

Electrical Engineering, February 1963, pp. 128–135, copy in 103–1M.

ROBERT M. WALKER, *Primary Examiner.*